United States Patent [19]

Snyder et al.

[11] Patent Number: 5,112,493
[45] Date of Patent: May 12, 1992

[54] ZIRCONIUM-HAFNIUM PRODUCTION IN A ZERO LIQUID DISCHARGE PROCESS

[75] Inventors: Thomas S. Snyder, Oakmont, Pa.; Ernest D. Lee, Ogden, Utah

[73] Assignee: Westinghouse Electric Corp., Pittsburgh, Pa.

[21] Appl. No.: 624,782

[22] Filed: Dec. 10, 1990

[51] Int. Cl.$^5$ ............................................. B01D 15/08
[52] U.S. Cl. ......................................... 210/656; 75/612; 210/198.2; 210/635; 210/682; 210/754; 210/770; 423/70; 423/73
[58] Field of Search ............... 210/688, 656, 682, 657, 210/659, 198.2, 679, 660, 669, 770, 677, 765, 805, 754, 635; 75/615, 340, 616, 344, 617, 751, 620, 621, 344, 587, 612; 423/70, 73, 72, 658.5, DIG. 14, 76, 2; 376/261, 313, 310, 352, 324, 311

[56] References Cited

U.S. PATENT DOCUMENTS

| | | | |
|---|---|---|---|
| 2,546,953 | 3/1951 | Street, Jr. | 210/672 |
| 2,571,237 | 10/1951 | Hansen | 210/688 |
| 2,759,793 | 8/1956 | Lister et al. | 423/70 |
| 2,860,956 | 11/1958 | Arden et al. | 423/70 |
| 3,032,388 | 5/1962 | McCord et al. | 423/73 |
| 3,510,292 | 5/1970 | Hardy et al. | 75/344 |
| 4,780,239 | 10/1988 | Snyder et al. | 210/679 |
| 4,915,843 | 4/1990 | Taniguchi et al. | 210/635 |
| 5,023,061 | 6/1991 | Snyder et al. | 423/70 |
| 5,024,749 | 6/1991 | Snyder et al. | 210/198.2 |
| 5,045,209 | 9/1991 | Snyder et al. | 210/198.2 |

FOREIGN PATENT DOCUMENTS 602663  8/1961  Belgium ............................... 423/73
755601  2/1951  United Kingdom ................. 423/73

OTHER PUBLICATIONS

Russian Chemical Review, Jul. 1967, p. 527.
Journal of Chemical Educational (no date), p. 534.
Belgian Report No. 80B (1961), pp. A1-A2.
J. M. Begovich and W. G. Sisson, Hydrometallurgy, 10, pp. 11-20 (1983).
W. D. Wilkinson and W. F. Murphy, "Nuclear Reactor Metallurgy," D. Van Nostrand Co., Inc., Princeton (1958) pp. 245-249.

Primary Examiner—Robert A. Dawson
Assistant Examiner—Sun Uk Kim

[57] ABSTRACT

A simple, low cost continuous process for separating and purifying zirconium and hafnium which eliminates liquid waste and facilitates the management of RCRA and LLW wastes is provided. An aqueous zirconium and hafnium—containing feed solution is prepared and fed to a continuously rotating annular chromatograph containing a bed of acid exchange resin. An acid eluant, such as hydrochloric acid, nitric acid, phosphoric acid or the like, is fed through the acid exchange bed while chromatograph is rotating, which separates the feed into substantially pure zirconium and hafnium fractions and into RCRA and LLW waste fractions. The zirconium and hafnium are processed further into nuclear quality zirconium and hafnium metals. The acid eluant is recycled for reuse in the chromatograph, and the RCRA and LLW waste fractions are disposed of in solid form.

18 Claims, 3 Drawing Sheets ued with sulfuric acid. The Belgian patent publica-
ZIRCONIUM-HAFNIUM PRODUCTION IN A ZERO LIQUID DISCHARGE PROCESS

TECHNICAL FIELD

The present invention relates generally to zirconium-hafnium separation processes and specifically to a zirconium-hafnium separation process whereby zirconium and hafnium chromatographically separated and purified in a single operation, which does not generate liquid waste.

BACKGROUND OF THE INVENTION

Commercial processes currently available for the production of nuclear grade zirconium are variations of a solvent extraction process wherein zircon sand is converted to zirconium metal as a result of a somewhat involved series of steps. This extraction process requires the use of an organic solvent, usually hexone, and various aqueous solutions, including hydrochloric acid. Hafnium, which is chemically similar to zirconium, must be separated from the zirconium. The hexone/thiocyanate/hydrochloric acid system employed for this purpose requires a series of separate extraction and separation columns. The zirconium, organic solvent and thiocyanate recovered from the hafnium separation steps are usually subjected to additional processing to insure that as much zirconium is recovered from the system as possible. The zirconium ultimately recovered from most extraction processes is in the form of pure zirconium oxide ($ZrO_2$). In a commonly used commercial process, the zirconium oxide is chlorinated to form $ZrCl_4$, which is purified and subjected to Kroll reduction to produce zirconium metal suitable for nuclear applications. The aqueous and organic liquids used in the process typically include waste metals and other materials that must be properly disposed of. One of the methods of treating these liquid wastes is to place them in holding ponds for future treatment and remediation. However, this is increasingly becoming an unacceptable waste management solution, particularly since federal and state laws relating to waste disposal have become more stringent.

The solvent extraction processes effectively separate zirconium from hafnium to produce zirconium of the quality required for use in nuclear reactors and elsewhere in the nuclear industry. However, the increasing concern expressed by the public, the scientific community and the regulatory agencies regarding the waste generated by solvent extraction processes has led the nuclear industry to explore alternative zirconium production methods which do not present the same waste management concerns. For example, the hexone-thiocyanate zirconium extraction process can generate offensive odors, and the waste from both the zircon sand chlorination process and the zirconium raffinate precipitation may include potentially toxic materials which must be properly disposed of.

Other zirconium-hafnium separation methods in addition to the aforementioned solvent extraction method have been proposed by the prior art. Ion exchange processes for separating zirconium and hafnium are described in U.S. Pat. Nos. 2,546,953 to Street and 2,759,793 to Lister et al., in British Patent No. 755,601 to Lister et al., and in Belgian Patent Publication No. 602,663. Adsorption processes are disclosed in U.S. Pat. Nos. 2,571,237 to Hansen and 2,860,956 to Arden et al.

In U.S. Pat. No. 2,546,953, Street discloses an ion exchange separation process wherein the mixed oxychlorides of zirconium and hafnium are passed through a cationic exchange resin and then recovered with hydrochloric acid. U.S. Pat. No. 2,759,793 and British Patent No. 755,601 to Lister et al. also disclose a method of separating zirconium from hafnium using a cationic exchange resin. Zirconium and hafnium in soluble salt form, which can include their oxychlorides, are passed through an acidified cation exchange resin and then eluted with sulfuric acid. The Belgian patent publication No. 602,663 discloses an ion exchange zirconium-hafnium separation and recovery method based on sulfate separation chemistry. Not only do these processes not produce a highly pure zirconium, but waste management is still a problem. In particular, each of these processes generates liquid waste which requires proper disposal.

Hansen, in U.S. Pat. No. 2,571,237, discloses the absorption of hafnium from a solution of mixed zirconium and hafnium chlorides with silica gel. Organic solvent containing purified zirconium values is then separated from the absorbent. U.S. Pat. No. 2,860,956 to Arden et al. also employs an organic solvent to extract the zirconium values from an absorbent containing both zirconium and hafnium. Although the aforementioned separation processes effectively separate zirconium in a usable form from hafnium, they do not avoid the waste management concerns associated with solvent extraction processes. The prior art adsorption processes require organic solvents to isolate the zirconium which must be disposed of. Moreover, the unpleasant odors and the other drawbacks that accompany the use of organic reagents are drawbacks to the contemporary use of these processes.

Consequently, the prior art has failed to provide a simple zirconium-hafnium separation process for producing nuclear quality zirconium which eliminates both liquid discharge and organic reagents and which is not accompanied by involved waste management procedures.

SUMMARY OF THE INVENTION

It is a primary object of the present invention, therefore, to overcome the disadvantages of the prior art and to provide a simple, low cost, environmentally manageable zirconium-hafnium separation process, which produces nuclear quality zirconium.

It is another object of the present invention to provide a method for separating zirconium and hafnium which completely eliminates liquid waste.

It is a further object of the present invention to provide a method for the production of substantially pure nuclear grade zirconium that does not require organic reagents.

It is yet another object of the present invention to provide a method for purifying and separating zirconium and hafnium which can be conducted continuously in a single operation.

It is still a further object of the present invention to provide a zirconium-hafnium purification and separation process which includes waste management as an inherent part of the process.

It is yet a further object to provide a zirconium-hafnium purification process which separates the waste products generated by the process into individual RCRA and LLW fractions.

The aforesaid objects are accomplished by providing a simple, low cost process for separating zirconium from hafnium which uses only aqueous reagents to produce substantially pure zirconium and hafnium. Liquid reagents are recycled to eliminate liquid waste discharge, and mixed metal wastes are separated by the present process into RCRA and LLW fractions, thus providing control over and facilitating waste management. In accordance with the present process, a crude zirconium-hafnium hydrolysate feed is prepared from zircon sand and introduced to an acid resin medium at a first point in a continuous annular chromatograph. An aqueous acid eluant is introduced to the chromatograph at a second point angularly displaced from the first point and is passed through the exchange resin as the chromatograph is rotated. The zirconium and hafnium fractions are collected at the bottom of the chromatograph. The rotation of the chromatograph also separates the various waste fractions and impurities, which are collected and disposed of. The acid eluant is recycled and reused. The zirconium and hafnium fractions may be concentrated by evaporation and roasted, separately, to their respective oxides and then chlorinated for reduction to pure zirconium and hafnium metal. The eluant from the evaporator and roaster overheads is condensed and recycled.

Additional objects and advantages will be apparent from the following description, claims and drawings.

DESCRIPTION OF THE PREFERRED EMBODIMENTS

The production of nuclear quality zirconium and hafnium can be achieved with currently available methods. However, as discussed above, these methods are accompanied by waste management concerns which may add to their cost and reduce their overall efficiency. Available zirconium-hafnium separation processes, moreover, involve multiple complex stages to produce zirconium metal of a purity and quality suitable for use in nuclear reactors and similar applications. The process of the present invention is an aqueous zirconium-hafnium chromatographic separation method which separates zirconium and hafnium in a single operation to produce substantially pure zirconium and hafnium while simultaneously separating non-liquid waste to facilitate its disposal. The present process recycles the liquid reagents used to effect the separation and, consequently, generates no liquid waste, which completely eliminates the waste management methods required for available Zr/Hf separation processes that do generate liquid wastes. Finally, the system employed by the present invention is entirely aqueous, which eliminates the unpleasant odors often associated with the organic reagents of the prior art processes.

Figure 1:
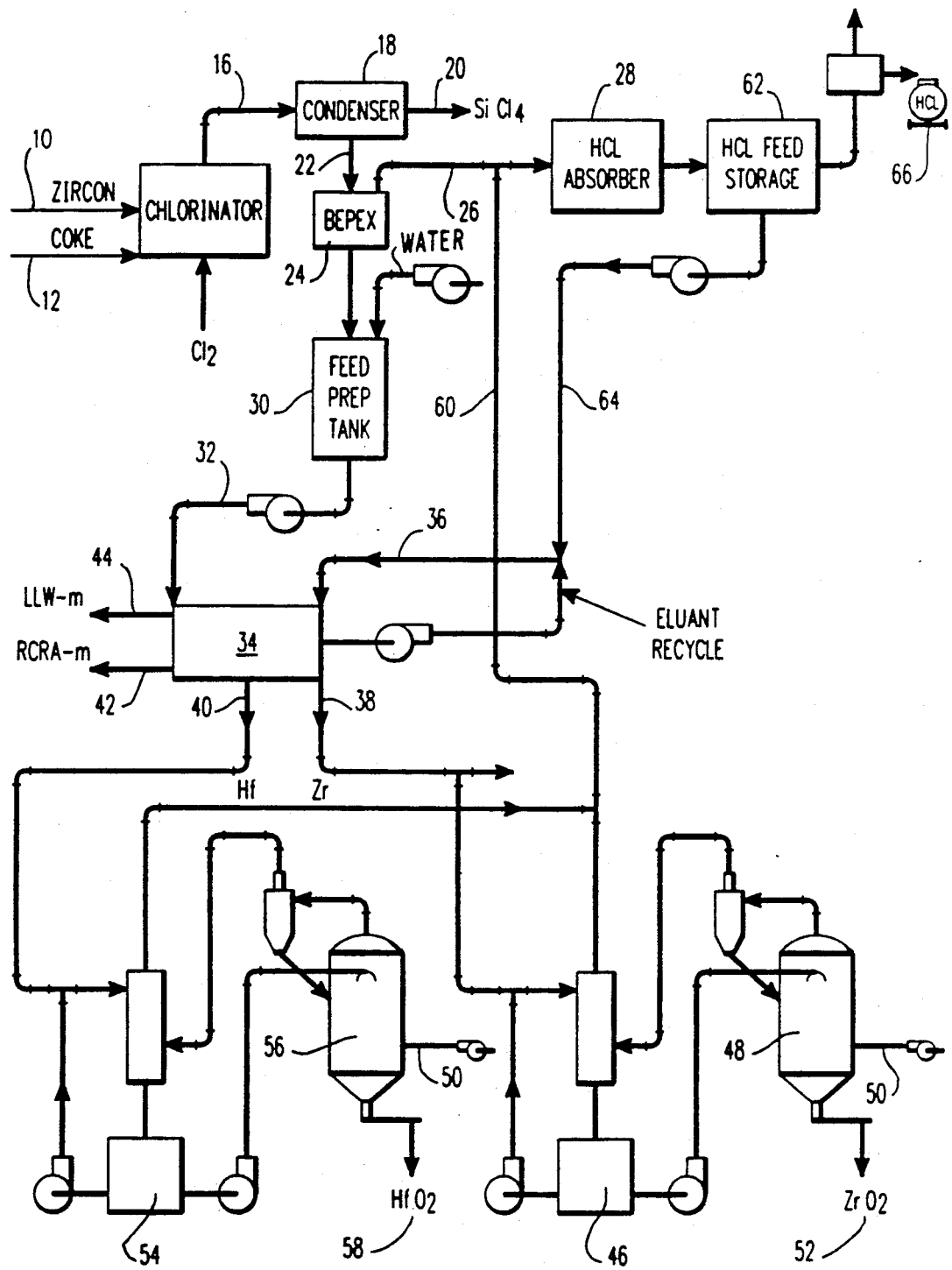
FIG. 1 is a schematic diagram of the zirconium-hafnium separation process of the present invention.

Referring to the drawings, FIG. 1 is a schematic illustration of the process of the present invention. The starting material preferred for use in the present process is zircon sand. The zircon sand 10 is chlorinated in the presence of a carbon source 12 in chlorinator 14 at a temperature in the range of 800° to 1100° C. Petroleum coke is the carbon source preferred for this purpose. A carbon/zircon ratio of 21 parts carbon/79 parts zircon has been found to be particularly effective. The gaseous stream 16 from the chlorinator 14 is selectively condensed in a condensor 18. Two streams are produced: a silicon chloride ($SiCl_4$) by-product stream 20 and a crude $(Zr/Hf)Cl_4$ fraction 22. The $(Zr/Hf)Cl_4$ fraction is processed further to form a feed stream which is ultimately separated into zirconium and hafnium metals.

The crude $(Zr/Hf)Cl_4$ fraction 22 is hydrolyzed in a two-step process, which is summarized by the following reactions:

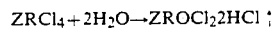

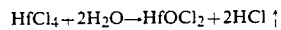

The hydrochloric acid (HCl) byproduct is driven off by partial hydrolysis with water ($H_2O$) in a first step which takes place in the BEPEX unit 24. This HCl byproduct stream 26, which is anhydrous HCl, is directed to an HCl absorber 28. In the second step, which takes place in a feed prep tank 30, complete dissolution of the $(Zr/Hf)Cl_4$ fraction is achieved. Alternatively, crude $ZrCl_4$ could be dissolved directly in a single step. The absence of HCl increases the solubility of zirconium tetrachloride ($ZrCl_4$) in water. This allows the production of higher feed stock zirconium concentrations than have been possible heretofore. Additionally, the volume of the crude zirconium hydrolysate stream 32 leaving the feed prep tank 30 is significantly reduced, which is the first point in the process at which waste is minimized. Concentrations of up to 270 grams of zirconium per liter can be achieved with this two-stage dissolution process. The currently used solvent extraction process produces concentrations of only 100 to 130 grams of zirconium-containing feed stock per liter.

The crude zirconium-hafnium hydrolysate 32 is fed to a continuous annular chromatograph 34. An eluant stream 36, which is preferably an acid, as will be described in detail hereinbelow, is directed to the continuous annular chromatograph 34. The zirconium fraction 38 and hafnium fraction 40 are separated and purified of other metal contaminants, specifically, RCRA (transition) metal wastes 42 and LLW (radioactive) metal wastes 44. If the eluant acid concentration is 2.5N, the concentrations of the product fractions separated by the operation of the continuous annular chromatograph 34 can reach approximately 20 grams of product per liter.

The zirconium product fraction 38 is directed first to a zirconium concentrator 46 where it is evaporated and then to a spray roaster 48, which is preferably heated by a gas burner 50. The zirconium product fraction 38 is spray roasted to a $ZrO_2$ product 52. The $ZrO_2$ is then chlorinated (not shown in the process schematic of FIG. 1) and subsequently reduced to zirconium metal.

The hafnium product fraction 40 is subjected to the same processing as the zirconium fraction 38. The aqueous hafnium is first concentrated in a concentrator 54 and then spray roasted in a hafnium spray roaster 56 to produce a HfO$_2$ product 58. The HfO$_2$ product is chlorinated (not shown) and reduced to hafnium metal.

The aqueous RCRA waste fraction 42 and the aqueous LLW waste fraction 44 are subjected to volume reduction and can be disposed of as dry solids. The disposal of these materials as solids is substantially easier than their disposal as aqueous or organic liquids. Moreover, they are separated by the chromatograph so additional processing to separate the RCRA and LLW wastes is not required. This capability provides an additional waste management benefit.

The acid eluant 36 is recycled after it has been passed through the continuous annular chromatograph 34. This acid eluant is recycled through an acid absorber such as HCl absorber 28. In addition, acid, typically HCl, from the zirconium spray roaster 48 and the hafnium spray roaster 56 is directed along acid recycle line 60 to the HCl absorber. The acid is stored in an acid feed storage tank 62 from which it is pumped back to the continuous annular chromatograph 34 along an eluant supply line 64. Some acid is typically generated by the present process, usually in the form of HCl. Some of the chlorine supplied to the chlorinator 14 will react with the zircon sand and coke to form the SiCl$_4$ by-product 20. The remainder of the Cl$_2$ forms hydrochloric acid 66, which may be combined with the acid eluant and used in the chromatographic separation. Since all barren acid eluant streams are recycled directly to the chromatograph, there are no aqueous wastes to be discharged.

Table I below compares the process steps required for the prior art solvent extraction zirconium/hafnium separation and those required for the chromatography process of the present invention.

TABLE I

Process Steps for Chromatography vs. Solvent Extraction for Zirconium/Hafnium Separation

| Hexone/Thiocyanate Extraction | Continuous Chromatography in Aqueous Chloride |
|---|---|
| Chlorination | Chlorination |
| Condensation | Condensation |
| One Step Hydrolysis → | Two-Step BEPEX Hydrolysis |
| Filtration | Filtration (Optional) |
| Iron Extraction / Hafnium Extraction / Zirconium Stripping / Hafnium Scrubbing → | Continuous Chromatography |
| Precipitation → | Roasting or Precipitation |
| Calcination | Calcination |
| Pure Chlorination | Pure Chlorination |
| Reduction | Reduction |

Although the preparation of the zirconium-hafnium feed and the reduction of the separated zirconium and hafnium fractions to their respective metals of these two processes are similar, the actual separation processes differ in significant respects. The prior art solvent extraction process requires at least four rather involved steps, each of which requires separate processing apparatus and aqueous and organic reagents, while the present process achieves an improved separation with a single processing step, a single apparatus, and only recycled aqueous reagents.

Figure 2:
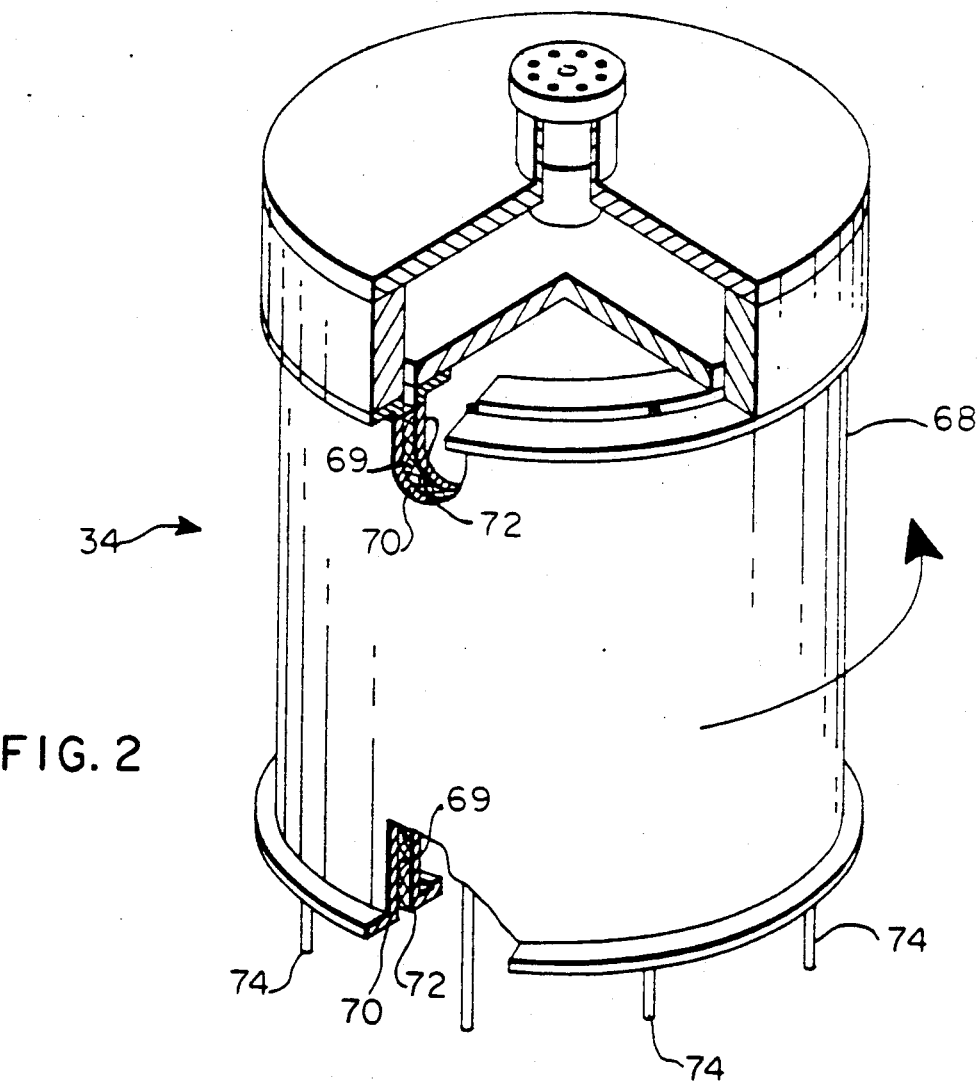
FIG. 2 is a side perspective view of one embodiment of a continuous annular chromatograph suitable for use in the process of the present invention.

The continuous annular chromatograph 34 preferred for use in the process of the present invention is shown in FIG. 2. A particularly preferred continuously operating chromatograph is the continuous annular chromatograph developed by Oak Ridge National Laboratory. This device comprises an annular stationary phase which is rotated about the axis of an annulus 68. The annulus 68 includes a stationary phase material, such as resin beads, packed between two concentric cylinders 70, 72 of differing diameters with vertical axes to form an annular bed. A feed port (not shown) is provided at a given angular position and one or more eluant ports (not shown) are provided at some angular offset from the feed port. It is preferred to place a layer of glass beads above the stationary phase material, and to feed the eluant on the top of the glass bead layer while feeding the zirconium/hafnium feed stock directly to the top of the stationary phase to prevent any undesired mixing effects.

The chromatograph includes a number of product ports 74 set at different angular positions which can be set arbitrarily to accommodate particular operating conditions. Each product port 74 collects an elution volume which has had a particular residence time in the chromatograph. The stationary phase 69 is typically rotated in the annulus 68 at a constant speed so that any vertical segment of the annular bed is above a particular fixed product collection port 74 at a given time after this segment has been loaded with zirconium/hafnium feed stock and eluant. Thus, each product collection port 74 has an angular position which corresponds to a particular elution time for a particular rate of rotation of the stationary phase 69 and for a particular flow rate through the stationary phase.

The flow rate through the stationary phase 69 is controlled by the pressure drop across the effective height of the stationary phase and the physical characteristics of the stationary phase, i.e., particle size and packing void volume. This pressure drop may be provided by the hydrostatic head of the feed stock and eluant, but it is preferably provided by pressurizing the device. The pressure required to achieve a particular flow rate is governed by the nature of the stationary phase (i.e., its packing, average particle size and particle size distribution). The smaller the average particle size of the resin beads making up the stationary phase, the larger the pressure drop required to obtain a particular flow rate over a particular effective height will be. However, the separation factor for any given theoretical stage is improved as the average particle size of the resin beads is decreased. Thus, the effective height needed to effect a given degree of separation is decreased as the separation capacity of a unit length (or theoretical stage height) is increased by decreasing the average particle size of the resin beads.

A short residence time in the chromatograph allows an increase in the zirconium and hafnium concentration in the product elution volumes. In general, the longer the residence time in the chromatograph is, the more "band spreading" occurs. "Band spreading" is a term of art used in this context to describe the phenomenon that can be observed when the longer the residence time is, the larger the proportion of the total elution volume which contains some of the desired product. To obtain all or a certain percentage of this product fraction, it is necessary to collect a volume of eluant which increases with residence time. Thus, the net effect of band spreading is to dilute the metal concentration in the product fractions.

The flow rate across the effective height of the stationary phase 69 and the rotational speed of the stationary phase should be coordinated so that a particular product fraction always elutes at the same angular position and, consequently, is always delivered to the same product collection port 74.

It is preferred that the chromatograph be operated in a displacement mode wherein no more than about 5 percent, more preferably no more than about 1 percent of the effective column height, is loaded with feed solution before elution is initiated. The angular displacement between the feed port and the eluant port and the speed of rotation of the annular bed are coordinated so that the time interval between loading and elution is just sufficient for the desired degree of penetration. The relationship between the time for loading and the depth of penetration is in turn governed by the flow rate through the annular bed.

The displacement may be effected by either an isocratic or a gradient supply of eluant. In the former case, the eluant can simply be supplied from a single port while in the latter case, several ports at successively greater angular displacements from the feed port are utilized. In the gradient mode, elution under the influence of the initial eluant is permitted to proceed until some separation has been effected, and then eluant with a higher concentration is supplied. This increases the migration speed down the column and minimizes the range of elution volumes or times over which a given component or product fraction will exit the column or, in other words, this procedure minimizes the band spreading.

Decreasing the elution volumes by gradient elution or by other means increases the concentration of the product in the product fraction. Concentrations greater than about 2 g/l, especially between about 20 and 70 g/l are preferred. It is preferred to maximize the concentration of product because the total volume of fluid to be processed will be reduced. This allows a reduction in the overall size of the system with a consequent reduction in capital and operating expenses. However, practical considerations, such as solubility limits, will constrain the maximum concentrations obtainable.

The flow rate down the chromatograph is governed by the pressure drop from the top to the bottom of the chromatograph and the nature of the stationary phase. The smaller the average particle size of the resin beads making up the stationary phase is, the higher the pressure drop that is required to obtain a given flow rate. This relationship is also affected by the particle size distribution of these resin beads. There is, however, a maximum attainable flow rate for any given resin stationary phase which cannot be exceeded by the application of additional pressure. The suppliers of such resins rate them in terms of flow rate per given pressure drop and maximum attainable flow rate.

It is preferred to use a stationary phase which will permit flow rates between about 2 and 80, more preferably between about 3 and 20 gallons per minute per square foot of cross sectional area (between about $1.36 \times 10^{-3}$ and $5.43 \times 10^{-2}$ m$^3$/sec, more preferably between about $2.04 \times 10^{-3}$ and $1.36 \times 10^{-2}$ m$^3$/sec per square meter of cross sectional area). There is a relationship between the achievable flow rates and the effective chromatograph column height needed for a given degree of purity. For a given system of stationary phase and eluant, the theoretical stage separation factor, $\alpha_s$, of the stationary phase will increase as the average particle size of the resin beads of the stationary phase decreases. However, as this particle size decreases, so does the flow capacity of the stationary phase. Thus, there is an inverse relationship between $\alpha_s$ and the flow capacity. A higher flow rate will require a greater effective column height to achieve the same degree of separation or product fraction purity.

Furthermore, there is the additional constraint that the pressure required to achieve the desired flow rate should not exceed the capability of available pumps, seals and feed tubing. The required pressure is a function of both the pressure drop needed per unit of effective height and the total effective height required for the desired degree of separation. Thus, as the flow capacity of the stationary phase is increased by a change in its physical configuration and, consequently, its theoretical stage separation factor, $\alpha_s$, is decreased, the required effective height and the required overall pressure drop are both increased. On the other hand, as the theoretical stage separation factor, $\alpha_s$, is increased by a change in the resin bead size distribution so that the flow capacity of the stationary phase is decreased, the pressure drop for a given effective height is increased. A pressure drop of less than about 2759 kPa (400 psi), more especially between about 345 and 1042 kPa (50 and 150 psi), is preferred.

Thus, to obtain a system with a commercially practical capacity, it is necessary to use a stationary phase which will simultaneously display both a reasonable theoretical stage factor, $\alpha_s$, and a reasonable flow rate per unit of effective height with a reasonable pressure drop. This can be achieved by an appropriate selection of both the capacity of the stationary phase resin and eluant.

It is preferred that several product collection ports 74 be used to collect a particular product fraction. This is accomplished by closely spacing these collection ports so that they more than span the angular range of rotation that corresponds to the elution time interval of that particular fraction, but do not extend to angular positions at which any significant portion of any other product fraction is expected to elute. Of course, this requires that the elution time intervals of different product fractions do not substantially overlap. That is, the alpha ($\alpha_s$) values should exceed 1 for all species. This arrangement tends to insure that minor fluctuations in the steady state elution behavior which would cause a slight advancement or retardation of the elution time of the desired product fraction will not result in any loss of this fraction.

Figure 3:
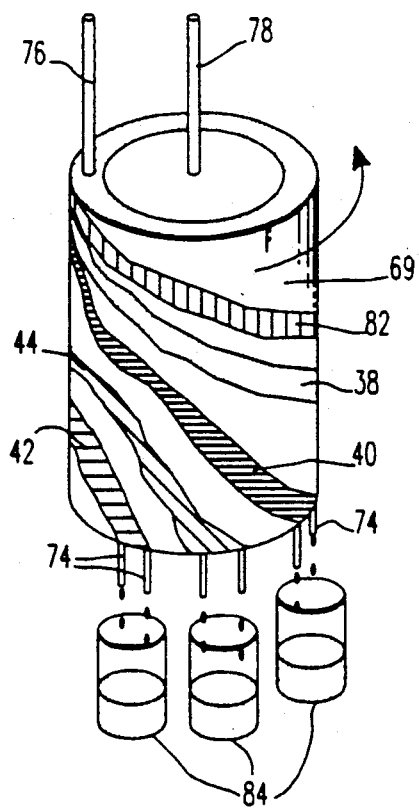
FIG. 3 illustrates diagrammatically the separation of zirconium, hafnium and waste fractions produced in the annular chromatograph of FIG. 2 by the process of the present invention.
Figure 4:
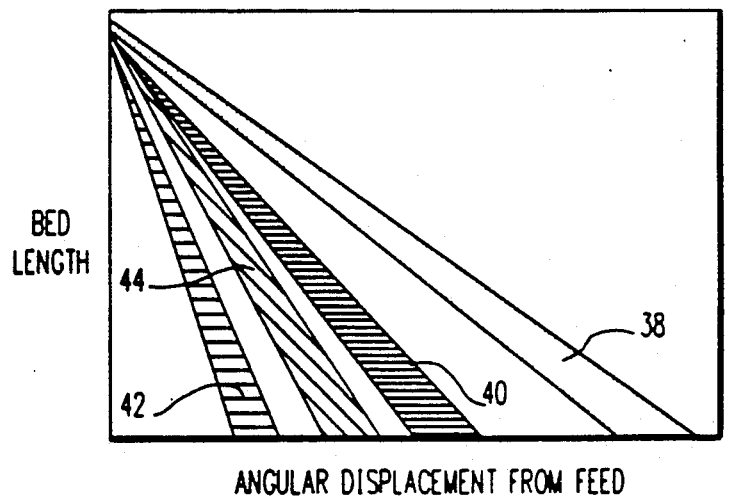
FIG. 4 is a graphic illustration of the angular displacement of the zirconium, hafnium and waste fractions separated according to the present process from the feed nozzle as a function of the length of the resin exchange bed.

FIG. 3 illustrates diagrammatically separation of the product fractions in the zirconium./hafnium feed solution after the feed solution has been eluted through the stationary phase 69 of the continuous annular chromatograph 34 according to the process of the present invention. A fixed feed inlet 76 is used to load the zirconium.-/hafnium feed and an eluant inlet 78 is used to direct eluant to the stationary phase 69. Although it is not shown, the eluant inlet 78 is may be connected to several inlet nozzles that direct eluant to various locations along the upper circumference 80 of the stationary phase. As the chromatograph rotates continuously, the product fractions in the feed are separated so that they are angularly displaced from the feed inlet 76 as shown in FIGS. 3 and 4. The four product fractions of primary concern are the zirconium fraction 38, the hafnium fraction 40, the RCRA waste fraction 42, and the LLW waste fraction 44. An additional product fraction 82 is also shown in FIG. 3 which represents any miscellaneous product present in the feed solution other than the four shown in FIG. 4. The separated product fractions are collected in the collection vessels 84 as shown in FIG. 3 and processed further as described above.

Only a single continuous annular chromatograph has been described in connection with the present process. However, any number of continuous annular chromatographs may be employed in the present process. For example, three such chromatographs may be effectively used. Each chromatograph unit would require a supply of zirconium-hafnium feed and would produce the product fractions described above.

Table II below sets forth the chromatographic operating conditions preferred for achieving the efficient and effective separation and purification of zirconium and hafnium in accordance with the process of the present invention.

TABLE II

| Preferred Chromatographic Operating Conditions | | |
| --- | --- | --- |
| | Range | Preferred |
| Feed Stream Concentration | 10-300 g/L | 220 g/L |
| Feed Solvent | Water | Water |
| Stationary Phase | Strong Acid-Weak Acid Exchange Resin | Strong Acid e.g., Dowix 21K |
| Stationary Phase Particle Size | | |
| Mean | .01 to 500 microns | <100 microns |
| Distribution | Polydisperse to Monodisperse | Monodisperse |
| Morphology | Arbitrary | Spherical |
| Mobile Phase (Eluant) | | |
| Solvent | Water | Water |
| Acid | HCl $H_2SO_4$ $HNO_3$ $H_3PO_4$ $HClO_4$ | HCl |
| Concentration | 2-6N | 2-2.5N for Zr Elution 2.5-4N for Hf Elution |
| Elution Mode | Gradient and Isocratic | Gradient |

The process of the present invention has been demonstrated to be significantly more economical than the solvent extraction method of the prior art. However, additional economies may also be realized by modifying some of the processing steps to substitute passive product recovery methods for the thermal methods described above. For example, membrane processing may be substituted for the thermal evaporation and roasting steps to reduce processing costs. Additionally, waste management costs may also be significantly reduced by the present process.

Industrial Applicability

The process of the present invention will find its primary application in the production of nuclear quality hafnium and zirconium when it is desired to employ a simple, low cost process for the separation and purification of hafnium and zirconium which simplifies management of the waste associated with the separation of these substances.

We claim:

1. A zero liquid discharge, continuous process for separating and purifying zirconium and hafnium which substantially eliminates waste disposal problems comprising:
   (a) preparing a concentrated aqueous zirconium and hafnium-containing feed solution;
   (b) loading said feed solution into a resin medium at a first point on a continuous annular chromatograph;
   (c) feeding an aqueous acid eluant to said resin medium at a second point angularly displaced from said first point on said chromatograph to elute said feed solution;
   (d) continuously rotating said chromatograph during steps (b) and (c) while said feed solution and said eluant diffuse through said resin medium;
   (e) separately collecting a substantially pure zirconium fraction, a substantially pure hafnium fraction and at least one waste fraction at locations on the annular chromatograph angularly and longitudinally displaced from said first point;
   (f) further separately processing said zirconium fraction and said hafnium fraction to produce nuclear quality zirconium metal and hafnium metal;
   (g) subjecting said waste fraction to volume reduction and disposing of said waste fraction as a dry solid; and
   (h) recycling said acid eluant for reuse in step (c).

2. The process described in claim 1, wherein step (a) comprises the steps of:
   (i) chlorinating zircon sand in the presence of carbon to produce a crude $(Zr/Hf)Cl_4$ fraction;
   (ii) partially hydrolyzing said crude $(Zr/Hf)Cl_4$ with water to produce $(Zr/Hf)OCl_2$ and HCl;
   (iii) removing the HCl component of step (ii) for reuse in said process; and
   (iv) completely dissolving said $(Zr/Hf)OCl_2$ in water to form said concentrated feed solution.

3. The process described in claim 1, wherein step (f) comprises the steps of:
   (i) separately concentrating each of said hafnium fraction and said zirconium fraction;
   (ii) spray roasting each of said concentrated hafnium and zirconium fractions to produce $HfO_2$ and $ZrO_2$; and
   (iii) first chlorinating and then reducing said $HfO_2$ and said $ZrO_2$ to produce substantially pure nuclear grade hafnium and nuclear grade zirconium.

4. The process described in claim 1, wherein said resin medium is selected from the group consisting of strong acid exchange resins and weak acid exchange resins.

5. The process described in claim 4, wherein said aqueous acid eluant is selected from the group consisting of HCl, $H_2SO_4$, $HNO_3$, $H_3PO_4$ and $HClO_4$.

6. The process described in claim 5, wherein the concentration of said acid eluant is 1 to 6 Normal.

7. The process described in claim 6, wherein said resin medium is a strong acid exchange resin, said aqueous acid eluant is HCl, and the concentration of said eluant is 2 to 4 Normal.

8. The process described in claim 1, wherein two said waste fractions are collected and said waste fractions comprise a transition metal fraction and a radioactive metal fraction.

9. The process described in claim 4, wherein said resin medium is a particulate material having a mean particle size of 0.1 to 500 microns.

10. The process described in claim 7, wherein said acid eluant is fed to said resin medium in a gradient elution mode.

11. A continuous process for producing substantially pure nuclear grade zirconium from zircon sand which generates no liquid waste and minimizes non-liquid waste, said process comprising:

(a) preparing an aqueous $ZrOCl_2$ feed solution by first chlorinating said zircon sand to produce $ZrCl_4$ and then hydrolyzing said $ZrCl_4$ to $ZrOCl_2$ in two steps to substantially completely dissolve said $ZrOCl_2$ in water and to produce aqueous HCl for further use and reuse in said process;

(b) feeding said $ZrOCl_2$ feed solution to a stationary phase of a continuous annular chromatograph at a first location at the top of said chromatograph;

(c) introducing a mobile phase comprising recycled aqueous HCl to said stationary phase at a second location displaced angularly from said first location;

(d) rotating said annular chromatograph during steps (b) and (c) to separate a zirconium product fraction from other product fractions in said feed solution so that each said product fraction is angularly displaced from said first location along the length of said chromatograph;

(e) collecting said zirconium product fraction from said chromatograph and further processing said zirconium product fraction to produce substantially pure zirconium metal;

(f) collecting said remaining product fractions and disposing of them as required; and (g) recycling said mobile phase for reuse in step (c).

12. The process described in claim 11, wherein said stationary phase comprises a particulate acid exchange resin having an arbitrary morphology, a polydisperse to monodisperse distribution and a mean particle size of 0.01 to 500 microns.

13. The process described in claim 11, wherein said stationary phase comprises a strong acid particulate exchange resin having a spherical morphology, a monodisperse distribution and a mean particle size of 0.01 to 500 microns.

14. The process described in claim 11, wherein said mobile phase acid has a concentration of 2 to 6 Normal.

15. The process described in claim 14, wherein said mobile phase acid has a concentration of 2 to 2.5 Normal.

16. The process described in claim 11, wherein the concentration of said $ZrOCl_2$ feed solution is 10 to 300 grams per liter.

17. The process described in claim 16, wherein said $ZrOCl_2$ concentration is 220 grams per liter.

18. The process described in claim 11, wherein said other product fractions include hafnium, transition metal wastes and radioactive metal wastes.

* * * * *